(12) United States Patent
Kodak

(10) Patent No.: US 7,933,506 B2
(45) Date of Patent: Apr. 26, 2011

(54) HEAT RESERVOIR FOR A STEAM ENGINE

(76) Inventor: James Allen Kodak, Odenton, MD (US)

( * ) Notice: Subject to any disclaimer, the term of this patent is extended or adjusted under 35 U.S.C. 154(b) by 622 days.

(21) Appl. No.: 12/037,131

(22) Filed: Feb. 26, 2008

(65) Prior Publication Data

US 2009/0212121 A1  Aug. 27, 2009

(51) Int. Cl.
*F24H 1/20* (2006.01)
(52) U.S. Cl. ......... 392/447; 392/441; 392/444; 392/456
(58) Field of Classification Search .................. 219/530; 392/441, 444, 447, 456; 60/648, 651, 668
See application file for complete search history.

(56) References Cited

U.S. PATENT DOCUMENTS

| | | | |
|---|---|---|---|
| 3,624,356 A | 11/1971 | Havill | |
| 3,977,197 A | 8/1976 | Brantley, Jr. | |
| 4,089,176 A | 5/1978 | Ashe | |
| 4,146,057 A | 3/1979 | Friedman | |
| 4,246,466 A | 1/1981 | Rice | |
| 5,385,214 A | 1/1995 | Spurgeon | |
| 7,614,397 B1 * | 11/2009 | Munson, Jr. | ................... 126/617 |

FOREIGN PATENT DOCUMENTS

| | | |
|---|---|---|
| JP | 2000097498 B1 | 4/2000 |
| JP | 2007032866 B1 | 8/2007 |

* cited by examiner

*Primary Examiner* — Thor S Campbell

(57) ABSTRACT

A heat reservoir for storing the energy necessary for powering heat engines, particularly steam engines, is disclosed. The heat reservoir converts electrical energy into thermal energy through the use of electrical resistance heating coils bathed in one or more high heat capacity metals. Loss of heat through thermal conduction is minimized through the use of an insulating jacket surrounding the reservoir. The stored heat can be quickly transferred to a working fluid, such as steam, by using both a heat storage metal and a heat exchanger metal that possess high thermal conductivity.

5 Claims, 4 Drawing Sheets

HEAT RESERVOIR FOR A STEAM ENGINE

BACKGROUND OF THE INVENTION

The internal combustion engine powering the vast majority of today's automobiles, power boats and lawn mowers has many drawbacks: the cost of fuel, the inconvenience of refueling, the depletion of a finite energy source, and the environmental impact of extracting, transporting, and burning billions of barrels of petroleum every year. There has thus been a long standing effort to develop alternative automotive energy sources. Utilizing electrical energy is one alternative, but this approach has required the use of batteries that have to date been proven to be too heavy, too expensive, and too limited in capacity to be of significant marketable use. The enclosed invention depends on electricity as the ultimate source of energy but stores that energy in a more practical way. Rather than relying on batteries, the electrical energy is converted to and stored as heat within a reservoir. This heat reservoir serves essentially as a replacement for the boiler in a steam driven vehicle. Without the boiler, there is no longer the need to vent combusted gas products and thus the greatest source of inefficiency in automotive steam engines is ablated. Furthermore, since the heat is already present within the heat reservoir, there is no longer then need to ignite a lamp within a boiler and wait for steam pressure to build up. The steam can be generated almost instantly.

Most of the engineering employing heat battery technology is directed towards regulating the operating temperature of specific components within various mechanical and electrical devices. The use of heat as a significant means of energy storage has received far less attention and efforts in this regard have been generally limited to home heating or providing a means for power stations to store energy during non-peak hours. There have been few efforts contemplating the use of a heat battery as a means of powering vehicles.

One effort in this regard is U.S. Pat. No. 5,385,214. It teaches that a heat battery can be used to power an automobile. It envisions utilizing the extraordinarily high heat capacity of water at its supercritical point of 374° C. and 221 bars, but to maintain the supercritical state while adding heat to the system would require an ever greater expansion of the heat battery. The exceedingly high volume required to store any significant amount of heat in this way makes this technology ill-suited for any common purpose.

Another effort in this regard is U.S. Pat. No. 4,094,377. It teaches that a steam engine can be used to recharge the batteries of an electric vehicle and that the heat for the steam engine's boiler can be derived from the sun. Since an automobile has very limited area available for solar panels, the amount of energy so derived is merely supplemental and can only marginally extend the range of an electric vehicle.

Strangely, the most significant contributions to the field of heat powered vehicles stems from the efforts of electricity producers to create buffer systems that address supply shortages that would otherwise arise when demand variations cannot be met with supply variations. These asynchronous situations have sparked numerous inventions relating to storing electricity in the form of heat. For instance, U.S. Pat. No. 4,146,057 teaches the use of aluminum as a heat storage means when the primary source of energy is solar and the heat is to be later retrieved in the form of electricity. JP2000097498 teaches a heat battery employing magnesia, magnetite, silica and/or alumina as heat storage materials and JP2007032866 teaches the importance of heat exchanger design, employing the use of fins emanating from the heat exchanger tube, when a heat battery is used for electricity generation.

SUMMARY OF THE INVENTION

The present invention is a heat reservoir that can serve as a boiler in a steam engine. It converts electrical energy into heat which is then used to make steam that drives a piston or turbine engine. Electrical energy is applied to a heating coil which is in contact with a reservoir containing aluminum, alumina or magnesium. The coil heats the aluminum at least to a temperature sufficient to convert water to steam. To prevent loss of heat, the aluminum is surrounded by a container with an extremely low thermal conductance. Water is pumped through a heat exchanger innervating the reservoir so that the water is converted to steam. This steam is then used to drive a piston or turbine engine. The residual steam then flows into a condenser which returns the steam to its liquid form.

The invention further discloses the use of a small vacuum chamber within the heat reservoir to accommodate the expansion of heated metal. It explains the necessity of an insulating jacket that encloses the reservoir and is nearly free of any gases so as to avoid the enormous pressures that would otherwise develop within the jacket. The heat reservoir is designed so that in the case of a serious accident causing a rupture of the reservoir, any molten metal is safely ejected from the vehicle out the bottom of the engine compartment and onto the ground. The reservoir is also equipped with a means of replacing the working fluid outflow conduit with an insulation plug.

Finally, in order to maximize the efficiency of the heat exchanger tube innervating the heat reservoir, the heat exchanger is equipped with corrugated appendages emanating from the outer skin of the heat exchanger tube and into the heat storage media in order to maximize the rate of heat exchange between the two.

BRIEF DESCRIPTION OF THE DRAWINGS

An embodiment of the present invention will now be described by way of an example and with reference to the accompanying drawings, in which.

DETAILED DESCRIPTION OF THE INVENTION

Figure 1:
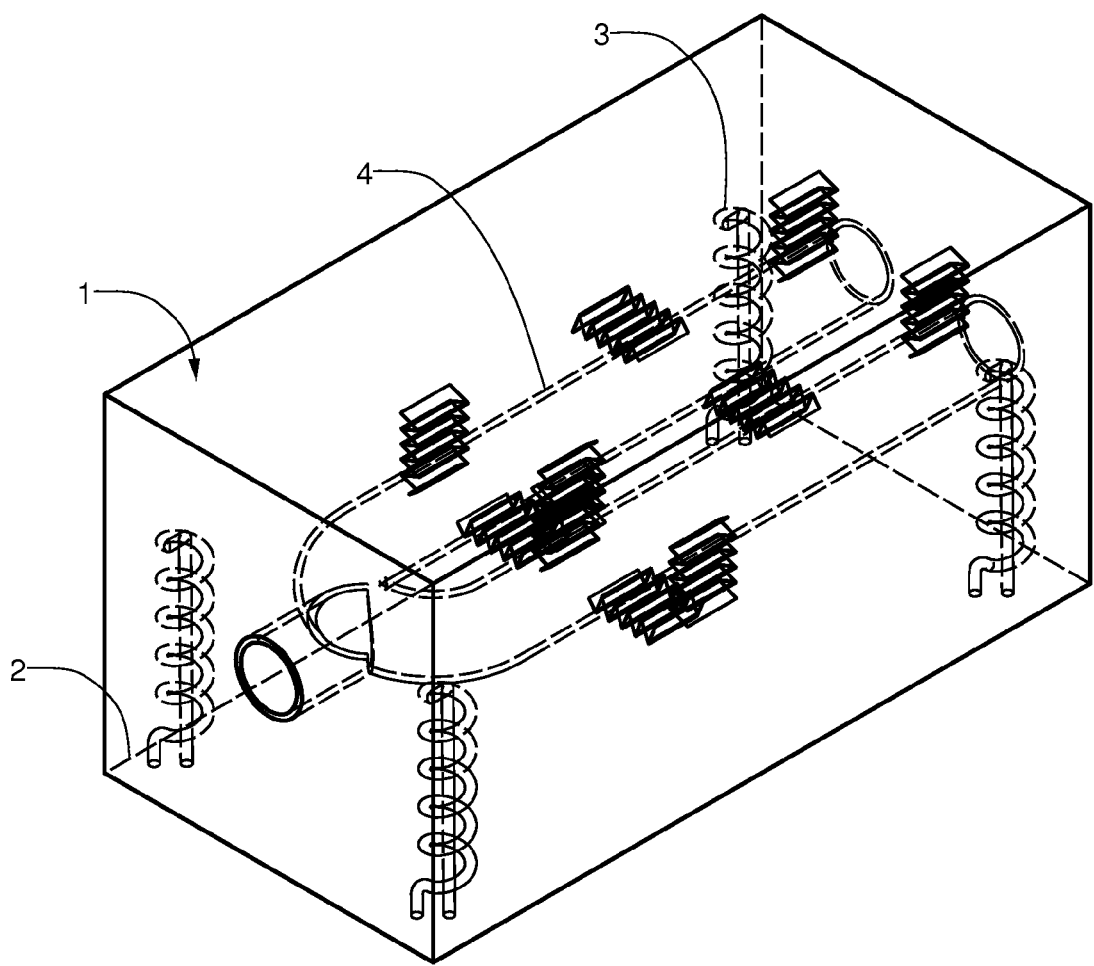
FIG. 1 illustrates a perspective view of the heat reservoir.

The preferred embodiment is a reservoir as shown in FIG. 1. The reservoir contains a heat storage material 1 comprised of mostly aluminum. The reservoir is generally cubical and the aluminum is enclosed within an insulating jacket 2. The heat storage material is heated using electrical resistance coils 3 and the heat stored within the reservoir is retrieved using a heat exchanger 4 through which a working fluid, such as water, can flow.

The maximum amount of heat energy that can be stored by the reservoir is a function of the amount of aluminum contained within the reservoir and the temperature to which it is heated. Between the temperatures of 150° C. and 657° C., aluminum has an average heat capacity of 1.1 J/g-° C. At 657° C., aluminum melts and exhibits a relatively high heat of fusion, 400 J/g. Thereafter, in the liquid phase, aluminum exhibits a constant heat capacity of 1.2 J/g-° C. Therefore, between the preferred operating temperatures of 150° C. to 800° C., 500 kg of aluminum stores 549×10$^6$ J of heat energy. By comparison, one gallon of gasoline has a heat of combustion equal to 130×10$^6$ J. In total, 500 kg of aluminum heated to 800° C. is the energy equivalent of 4.2 gallons of fully combusted gasoline and can be stored in a volume of less than 0.2 m$^3$.

500 kg of alumina ($Al_2O_3$) over the same operating temperature range possesses the energy equivalent of 2.1 gallons of fully combusted gasoline and can be stored in a volume of less than 0.13 m$^3$. Despite its lower heat capacity, for certain applications alumina may be preferred in that it is denser than aluminum and has a melting point well above the operating temperature range. This makes alumina much safer in the event of reservoir rupture. Magnesium is another option. 500 kg of magnesium stores the equivalent of 4 gallons of gasoline and can be stored in a volume of 0.3 m$^3$.

The preceding calculations assume a heat storage medium that is not charged to a temperature above 800° C. This cut-off point is chosen for calculation purposes, it should not be construed as an absolute maximum operating temperature. It is based upon several practical considerations the foremost of which is the fact that presently available steam engine components will degrade rapidly if exposed to steam in excess of 800° C. It should be noted that heating several hundred kilograms of high heat capacity metal within a reasonably short period (approximately 1 or 2 hours) requires a significant power draw; therefore the maximum reservoir temperature should be significantly below the maximum temperature achievable for the heating elements in order to minimize the amount of time required for charging. It should also be noted that the ideal heat storage metals have a melting temperature below 800° C. in order to maximize heat capacitance through utilization of the heat of fusion; and the further the maximum operating temperature is from the melting point, the greater the need to accommodate the steady expansion of the metal that occurs with increasing temperature while in the liquid phase.

The ideal substances for storing heat within the reservoir maximize the amount of energy that can be stored within a small amount of space and also be able to absorb and discharge heat at a high rate. The key physical properties to be considered include: heat capacity, density, thermal conductance, and a melting point in the range of 500° C. to 800° C. The upper limit of the range is based on the need to utilize the heat of fusion of each substance before the maximum operating temperature is reached. The lower limit takes into account the considerable expansion that occurs with each increasing temperature grade once the liquid phase is reached.

Aluminum, alumina, and magnesium can be supplemented with high heat capacity metals such as: lithium, beryllium, osmium and compounds thereof. Neither lithium, beryllium, or osmium should be considered as candidates for primary heat storage purposes given the fact that they are scarce and very expensive. For instance, LiOH possesses the highest heat capacity of any known solid, yet it could never be used as a main heat storage material since the world-wide production of lithium is approximately 20,000 metric tons as of 2006. This is completely insufficient for mass-produced engines, given the high amounts of material required for each automobile. Nor can production of lithium be significantly increased since the only economical means of extracting lithium comes from a limited number of brine pools. Beryllium and osmium are both rare earth elements whose annual production is even less than lithium's. Therefore the utility of these supplemental metals would be limited to providing high end performance enhancing alloys in special applications.

One significant problem with using heat for energy storage, is the potential for heat leakage. This is particularly the case when the heat being stored involves very high temperatures and materials possessing high thermal conductivity. Therefore, the efficacy of the insulating jacket design is critical to the overall performance of the heat reservoir steam engine. The jacket must be able to maintain its physical integrity while in contact with the heat storage medium at its maximal temperature and the jacket must also minimize the degree of heat leakage. This requires an inner layer with a melting point well above 800° C. and the application of one or a combination of materials with a very low heat conductivity. Furthermore, since the jacket will be exposed to such high temperatures, it is critical that the jacket layers possess virtually no gases. The presence of any significant amount of air or other gas within the insulating jacket would generate enormous pressures requiring thicker and heavier inner and outer support layers than would otherwise be necessary.

Figure 2:
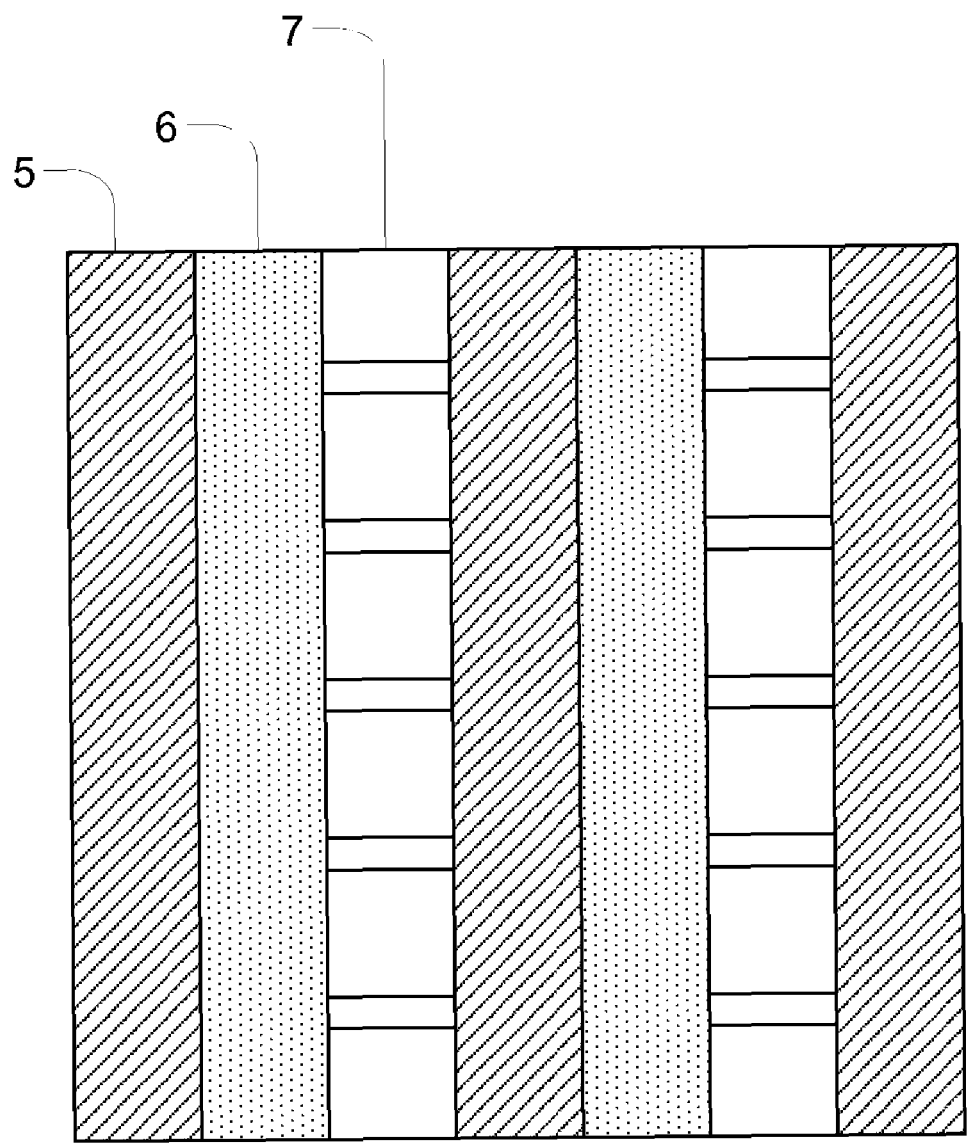
FIG. 2 illustrates a cross-sectional view of the insulating jacket enclosing the heat reservoir shown in FIG. 1.

A preferred method for insulating the aluminum reservoir is provided in FIG. 2. It shows an insulating jacket comprised of multiple layers of steel 5, silica 6, and vacuum 7. 1 cm of steel would make direct contact with the heat storage medium, 1 cm of silica would surround the steel layer, and then 1 cm of vacuum would surround the silica layer. This combination should be repeated twice culminating in a final out layer of steel. The support and positional integrity of the vacuum layers should be maintained with low heat conducting spacers, preferably made of silica, mounted within each vacuum layer.

In the alternative, the insulating jacket could be comprised a single layer of silica aerogel sandwiched between two layers of steel. Evacuated silica aero gel would be the preferred substance for this single layer as it possesses the lowest thermal conductance of any known substance, approximately 0.004 W/m-K, and has a melting point of 1200° C. The degree of heat leakage would be a function of the thickness of the silica aerogel layer. For example, given a reservoir with an interior surface area of 0.3 m$^2$, a fully charged heat storage medium temperature of 800° C., an exterior temperature of 25° C., and a silica aero gel thickness of 6 cm, the resultant heat leakage would be a mere 10 W. A 12 cm layer of silica aerogel would yield a 5 W leakage.

Another demand upon the insulating jacket involves the need to minimize the risks associated with rupture. A rupture of the reservoir when aluminum or other heat storage medium is in its molten phase, 657° C. or above for aluminum, poses a serious safety hazard. A significant rupture would most likely result from a high speed collision that could throw molten material in any given direction. Such a happenstance would dramatically raise the temperature of anything the molten material comes in contact with including the vehicle frame and thereby pose a threat to the vehicle's occupants. Further, since a rupture of the reservoir would almost certainly accompany the crushing of any hood covering the engine, rupture also poses a threat to people outside the confines of the vehicle.

To address this problem, it is recommended that in the event of rupture, molten aluminum or other heat storage medium should be directed immediately downward so that any contact with the frame and other vehicle parts is minimized. This can be accomplished by simply making the lowest portions of the heat reservoir weaker than the rest, preferably through the use of a thinner inner and outer steel layer for the insulating jacket. In the alternative, a specific ultra-high pressure release valve can be placed at the bottom of the reservoir and provide a point of egress for any molten aluminum and/or other molten heat storage medium.

Figure 3:
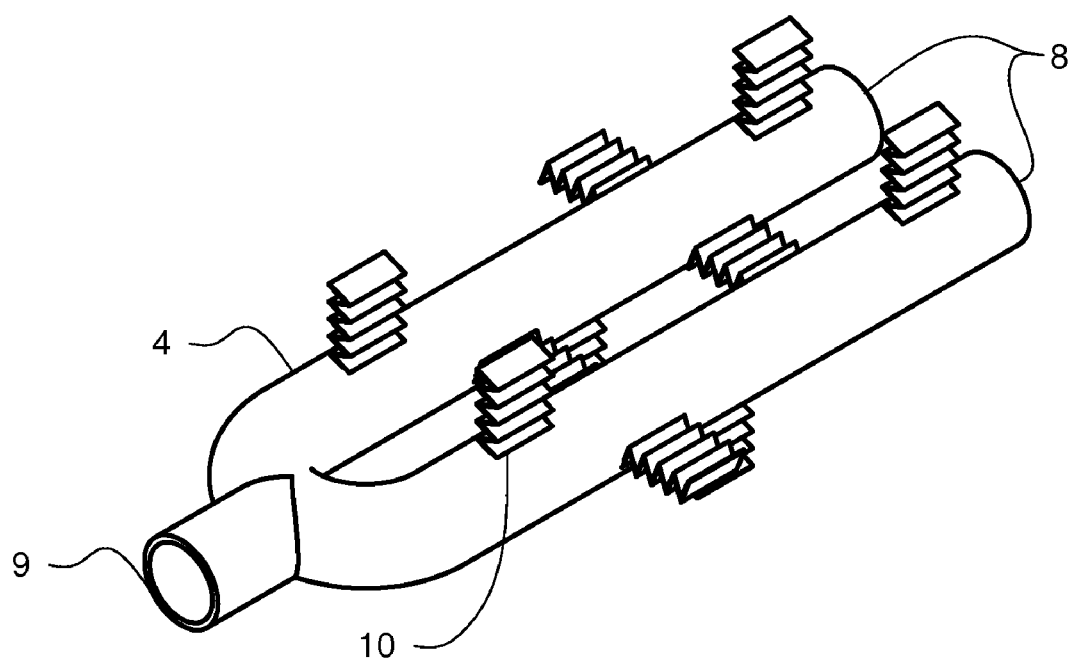
FIG. 3 illustrates a perspective view of the heat exchanger that traverses the interior of the heat reservoir shown in FIG. 1.

To provide the steam necessary to drive the turbine blade or piston engine, the heat from the aluminum reservoir must interface with water. The preferred embodiment would accomplish this through the use of a tube heat exchanger, as shown in FIG. 3. To maximize heat transfer, the tube should be made of a material with a high thermal conductance. This material must also have a melting point well above the 800° C. maximum temperature of the reservoir. Many metals meet these criteria, but given its abundance, copper is preferred. Furthermore, the issue of sufficient heat transfer is not limited to the interface between the copper tube and water, the interface between the aluminum reservoir and the copper tube is just as important. Although both aluminum and copper possess a high thermal conductance, during high energy demand there will be a significant cooling effect due to high water flow. If it is necessary to increase the surface area over which the copper tube and the reservoir interface, one can use multiple tubes 8 that converge at a single steam outlet 9 or attaching thereto corrugated arms of copper 10 that radiate from the outer surface of the tube and into the reservoir matrix. As these radial arms or fins serve to increase heat transfer, there utilization can shorten the cross-section of the heat exchanger tube. Limiting this cross-section serves two functions: (1) it leaves more reservoir volume for the heat storage medium and (2) given a certain skin thickness, it will strengthen the manifold enabling it to withstand higher pressures.

The amount of power being delivered by an aluminum reservoir heat transfer steam engine will be regulated by two valves: the valve controlling the amount of water being injected into the reservoir and a second valve controlling the amount of steam released to the turbine or piston chamber. In between these two valves will be the enclosed space comprising the heat exchanger tube. The first valve, the water injection valve, controls the total amount of water available for conversion to steam. The second valve, the pressure release valve, will provide power to the drive system by releasing the pressure built up within the heat exchanger. As such, the water injection valve controls the maximum steam power available at any given time and the pressure release valve controls how much of that power is made available to the drive system. In order to provide power on demand, it is preferable to always maintain a high constant pressure within the heat exchanger. Constant pressure can be maintained by opening the pressure release valve as the accelerator pedal is depressed and making the water injector an autonomous valve that injects water whenever the pressure within the steam chamber falls below a certain threshold.

Figure 4:
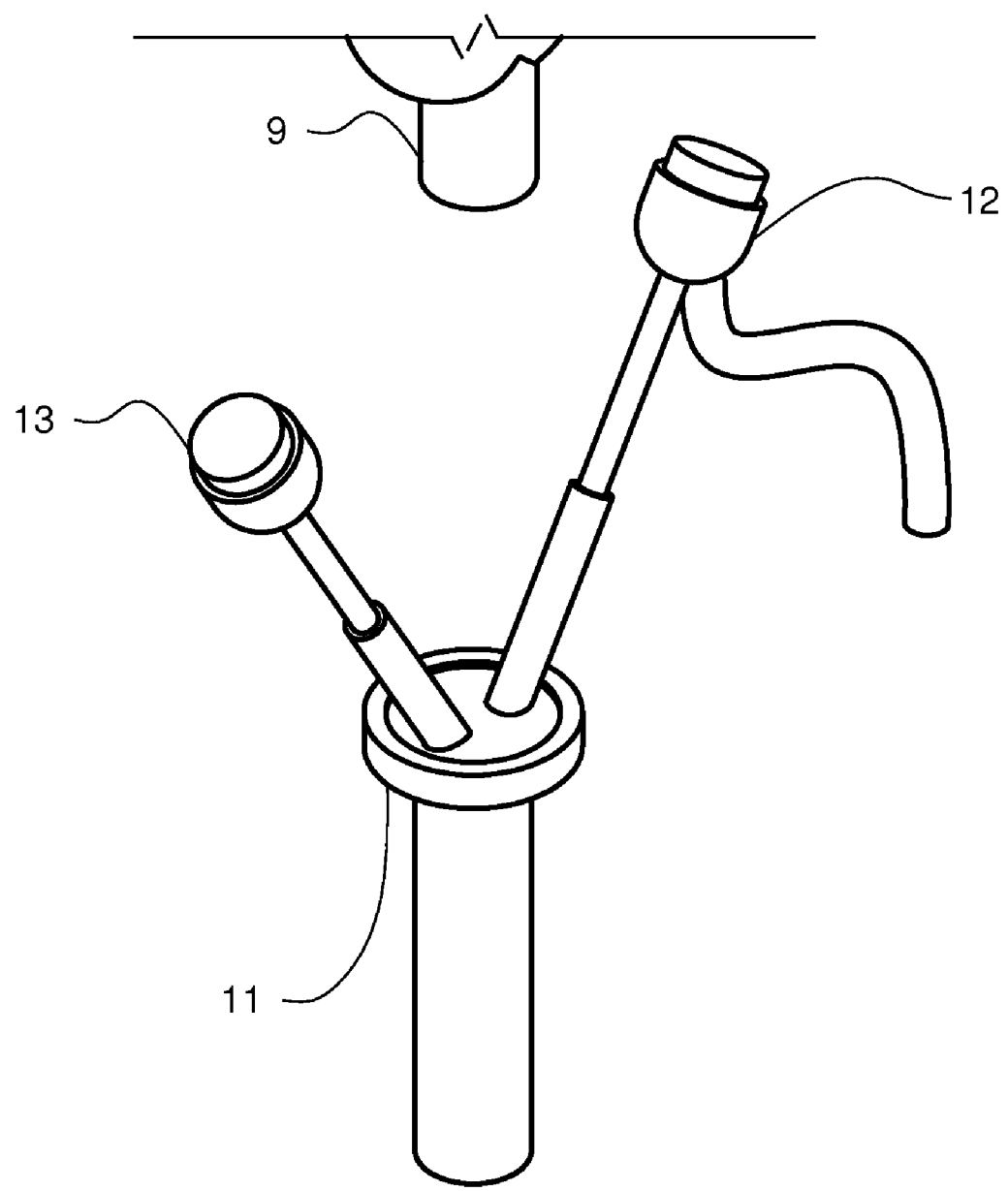
FIG. 4 illustrates a mechanism that, when the heat reservoir is no longer providing steam for motive energy, replaces the steam conduit engaging the heat exchanger outlet at the surface of the heat reservoir with an insulation plug.

When the engine is no longer in use, the working fluid conduit extending from the reservoir would be the source of significant heat loss. For even when water is no longer being actively pumped through the heat exchanger, there will still be residual gases that can readily carry heat from the reservoir to the much cooler portions of the vehicle via the outflow conduit. In order to address this problem, there needs to be a mechanism 11, as shown in FIG. 4, which removes the conduit 12 from interfacing with the reservoir steam outlet 9 and replace the conduit with a plug 13 that forms a hermetic seal that is substantially the same and continuous with the insulating jacket 2 surrounding the reservoir. This plug should be equipped with a pressure release valve to permit the escape of any residual high pressure build up following the application of the plug. The preferred embodiment of if this mechanism 11 employs two retractable arms 14. One end of these arms is connected to a pivoting base 15 which is operated by an electric motor. The other ends are firmly mounted to either the conduit 12 or the plug 13. Upon engine shut down, the mechanism 11 will receive a signal to actuate the following sequence of events: (1) The retractable arm mounted to the conduit will retract from its reservoir receiver, (2) the electric motor will pivot the conduit arm away from the receiver while moving the plug arm into place, and (3) the plug arm will extend into the receiver forming a seal therewith. The power necessary for retraction and extension of the arms will be provided by solenoids in each.

I claim:

1. A heat storage device serving as a boiler for use in a heat engine designed to power land vehicles, boats, and lawn mowers, comprising:
   a.) a fully enclosed reservoir possessing an insulation means,
   b.) a heat storage medium consisting of mostly aluminum, alumina or magnesium by weight and supplemented with any element or compound possessing a combination of the following properties at standard conditions: a melting point greater than 500° C., a heat capacity greater than 0.9 J/g-C, and a density greater than 1.5 g/cc,
   c.) an electrical resistance heating element for charging said heat storage medium,
   d.) a manifold innervating said heat reservoir for transferring heat to a working fluid,
   e.) a vacuum pocket within said reservoir to accommodate the expansion of the heat storage medium within said reservoir, and
   f.) a means of automatically removing the working fluid outflow conduit from the reservoir and replacing it with an insulation plug.

2. A device as in claim 1, in which the insulation means is comprised of a substance with a thermal conductivity less than 0.05 W/m-K.

3. A device as in claim 1, in which the reservoir surrounding the heat storage medium is comprised of an inner layer made of metal or ceramic and this inner layer is surrounded by at least one layer composed of a substance with a thermal conductivity in vacuum of less than 0.05 W/m-K and at least one layer of a vacuum maintained with low thermal conducting support elements therein and this layer or layers are surrounded by an outermost metallic or ceramic layer.

4. A device as in claim 1, in which the physical integrity of said reservoir, assuming a substantially cubical shape, has it weakest point or area within the lowest plane of the cube.

5. A device as in claim 1, in which the said innervating manifold has one or more radial appendages extending from the outer skin of the manifold and into the heat storage medium.

* * * * *